Sept. 6, 1949.    C. W. OSNER    2,480,953
UNITARY BRAKE BEAM AND HEAD
Filed April 25, 1947    3 Sheets-Sheet 1
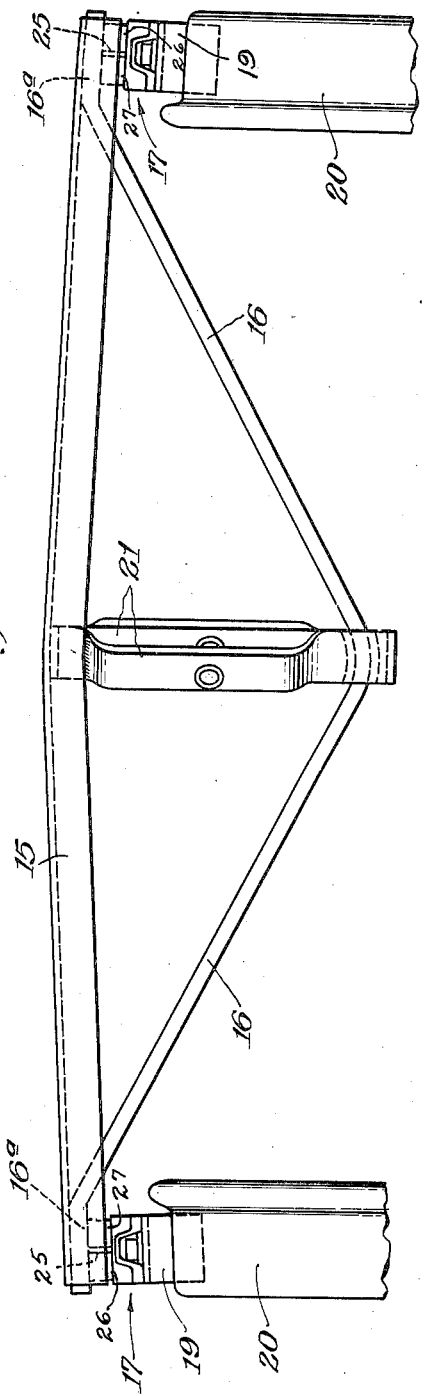
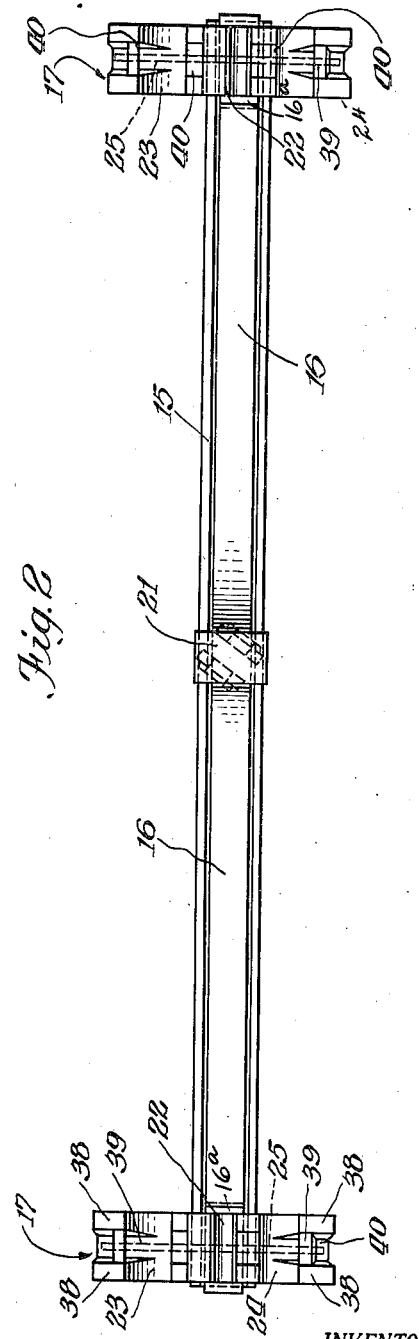
INVENTOR.
Clarence W. Osner
BY
Harvey M. Gillespie
Attorney.

Sept. 6, 1949.  C. W. OSNER  2,480,953
UNITARY BRAKE BEAM AND HEAD
Filed April 25, 1947  3 Sheets-Sheet 2
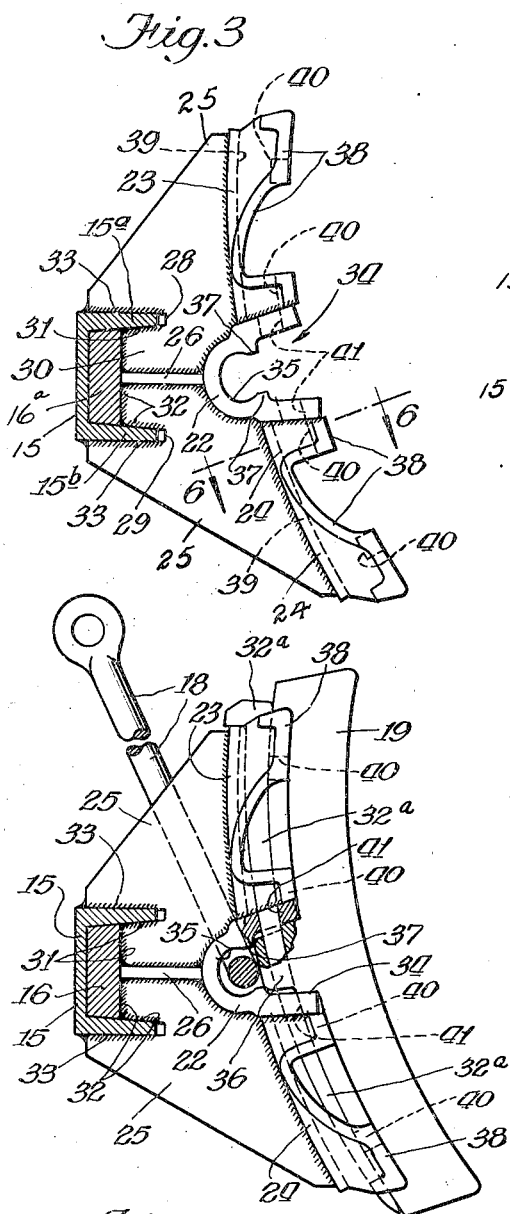
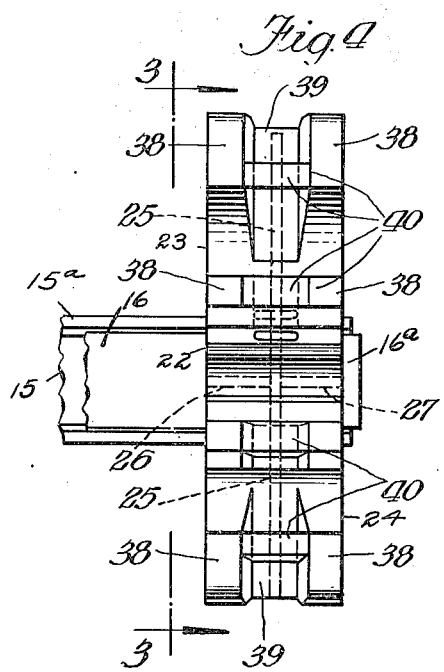
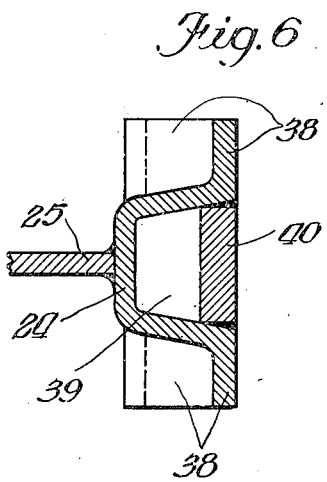
INVENTOR.
Clarence W. Osner
BY
Harvey M. Gillespie
Attorney.

Sept. 6, 1949.  C. W. OSNER  2,480,953
UNITARY BRAKE BEAM AND HEAD
Filed April 25, 1947  3 Sheets-Sheet 3
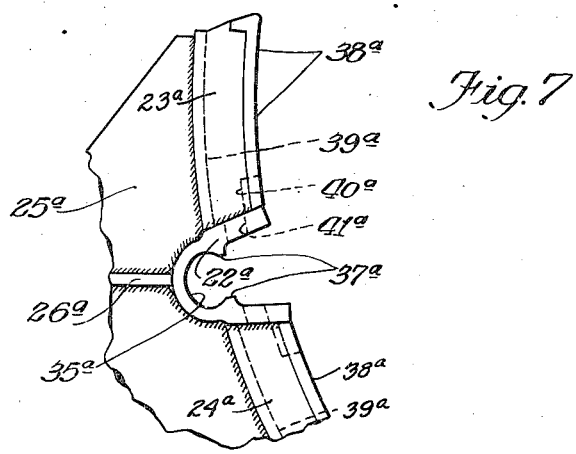
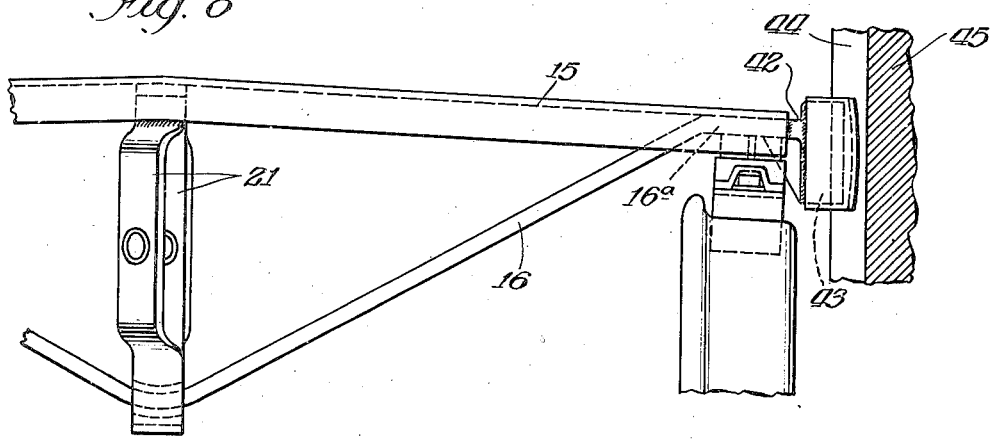
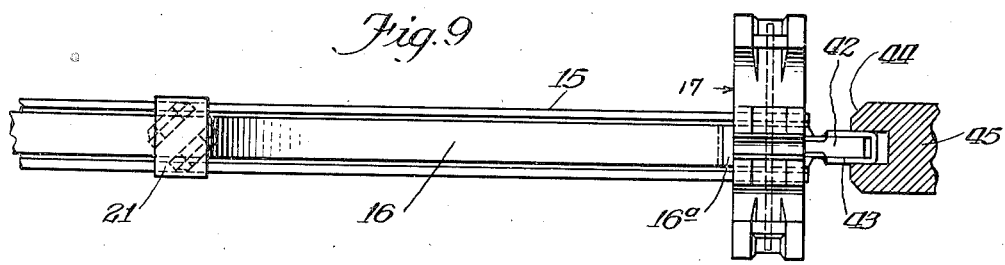
Inventor:
Clarence W. Osner
By: Harvey M. Gillespie
Attorney Patented Sept. 6, 1949

2,480,953

UNITED STATES PATENT OFFICE 2,480,953

UNITARY BRAKE BEAM AND HEAD

Clarence W. Osner, Chicago, Ill.

Application April 25, 1947, Serial No. 743,825

6 Claims. (Cl. 188—223.1)

This invention relates to railway car brakes and has to do particularly with improvements in the means, including the brake beam and the heads associated therewith, for mounting and supporting the brake shoes in position to be moved into and out of braking engagement with the wheels of the car.

A principal object of the invention is to simplify the constructions of the several parts and to provide new arrangements whereby the effective life of the brake beam and associated parts thereof will be substantially extended.

The brake beams, brake heads and tension rod elements of the similar structures heretofore made, have been made as separate parts. The brake heads have been usually made of cast metal and are fitted onto the opposite ends of the beam. Such castings are usually provided with flanges or pockets which embrace the ends of the beam and are held in position thereon by means of nuts threaded onto the ends of the tension rod which extend through the brake heads. Considerable difficulty has been experienced in the old forms of structures in obtaining the required degree of strength and durability at the ends of the beam to enable the structure to stand up under heavy use conditions. In connection with many such structures heretofore, the tension on the parts and the localization of the strain at certain critical locations in the structure have contributed to breakage and displacement of parts. Such failures have been the direct cause of many serious derailments of railway cars.

It is therefore one of the objects of the present invention to provide an improved arrangement of connections between the beam member and the tension member and between such parts and the brake shoe such that the strength of the connections shall be very great and such as will minimize the bending and shearing strains heretofore imposed on the old forms of structures and thereby minimize the likelihood that the parts breaking or becoming crystallized by vibration and thereby weakened so as to result in failure. To this end, the invention provides an improved construction of connecting means in which a plurality of cooperating parts are connected firmly and evenly by welding into a smooth working arrangement of reinforcing elements between the beam and the tension member and between those parts and the usual brake shoe.

It has been another object of the invention to provide an improved arrangement of means for supporting the brake beam and its associated parts in operative position with respect to the car wheels, so as to insure as completely as possible that there shall be continuously smooth and easy operation of the brake and to insure that at all times the brake means shall be supported in its raised position with respect to the wheels without danger of falling into position in which it might possibly cause a derailment or a wreck.

The preferred means by which the several objects are attained are illustrated in the accompanying drawings, wherein:

Fig. 1 is a top plan view of a brake beam and associated parts embodying my invention.

Fig. 2 is an elevational face view of the arrangement as shown in Fig. 1 but with the car wheels and the brake shoes removed for clearness of illustration.

Fig. 3 is a vertical sectional view through the brake beam structure, taken substantially at the line 3—3 of Fig. 4.

Fig. 4 is a face view of the parts as seen from the right in Fig. 3.

Fig. 5 is an end view of the brake beam arrangement, with a brake shoe secured to the brake head and showing a brake hanger link for supporting the brake in position.

Fig. 6 is a vertical sectional view taken substantially at the line 6—6 of Fig. 3.

Fig. 7 is a side face view of a fragmentary portion of a modified form of brake head structure.

Fig. 8 is a top plan view of a brake beam assembly embodying a modified form of the means for supporting the brake from the frame of the car; and Fig. 9 is an elevational view of the arrangement as seen in Fig. 8.

Referring now to Figs. 1 to 6 inclusive, of the drawings: The embodiment shown there comprises a brake beam 15, a tension member 16, a brake head 17; a hanger 18 removably attached to the head, and a shoe 19 removably attached to the head.

The brake beam 15 may be of any desired shape in cross-section, but it is shown herein in the form of a channel which extends across from one car wheel 20 to the other so as to support brake heads 17 and shoes 19 in operative positions with respect to such wheels. The tension member 16 will normally vary in its cross-sectional form in accordance with the strength required. Accordingly, for light capacity trucks the major portion of the tension member may be round in cross-section and for the larger capacity trucks it may be in the form of a flat bar. For convenience of illustration the tension member 16 herein shown, is in the form of a flat strip of metal. Said tension member is bent to the configuration shown in Fig. 1 and the opposite ends are upset to provide thickened portions 16a which fit snugly within the channel portion of the beam 15 and are welded to the flanges of the beam throughout the lengths of the portion 16a. It will be observed, therefore, by inspection of Fig. 1 that the tension member is firmly united to the beam at the juncture of the angular arms with the beam. Consequently there is no possibility of a yielding or bending of the tension member at said juncture.

The middle portion of the tension member 16 is spaced from the middle portion of the beam 15 by means of a spacer member 21 in the form of a strut. Said tension member is welded to the beam while it is in tightened condition with respect to the beam and the strut so as to constitute an effective truss device of great strength in proportion to its weight. The strut 21 is provided with openings therethrough for the connection therewith of any suitable means for operating the brake.

The head members, instead of being removably attached to the beam and held in position by the tension member as has been the customary practice heretofore, are secured rigidly to the beam structure. This rigidity is obtained by welding each head to the beam and the tension member at a location outwardly from the angular juncture of the arms of the tension member with the beam. In this way the beam structure will be adequately supported by its direct connection with the hanger 18 through the heads 17 so that the beam 15, head 17 and shoe 19 will not drop or be permitted to drop beneath the wheels in a manner to cause derailment of the truck.

In addition to welding the brake head directly to the beam 15, the brake head is, preferably, made of several separate pieces. The built-up structure herein shown makes it possible to provide a stronger structure which is much more stronger and durable than the structures now in general use. The head structure 17 as herein shown comprises three die forgings 22, 23 and 24 which are secured to the beam 15 by means of connecting plates 25, 26 and 27. The plate 25 may be cut to the desired configuration by any suitable means. Preferably it is cut to provide recesses 28, 29 which accurately fit over the flange 15a and 15b of the brake beam. The portion 30 of the plate 25 which extends between the flanges of the beam 15 is welded as shown at 31, 32 to the inner faces of said flanges and to the thickened end portions of the tension member. The portions of the plate engaging the outer faces of said flange are welded thereto as indicated at 33.

For making the structure as strong as possible with the use of a reasonable weight of metal, and for providing the usual brake heads for the removable mounting of the brake shoes on the structure, metal gusset plates 26 and 27 are provided at opposite faces of the connecting plate 25, such gusset plates being welded to the plate 25 and to the outer face of the tension member 16.

The die forging 22 is welded to the edge faces of the plates 25, 26 and 27. The channel portion of this die forging is designated 34 and opens outwardly toward the right of Figs. 3 and 5. The bottom of the channel is rounded as shown at 35 to provide a suitable bearing for hanger 18. The outer portion of the channel 34 constitutes a socket for receiving a lug 36 formed on the removable shoe 19. It will be observed by inspection of Figs. 3 and 5 that the rounded portion of the channel 34 is separated from the outer portion by means of ribs 37. Consequently the member 22 is initially formed flat or with the top and bottom sides thereof spread apart to a greater extent than shown in the drawings. The said element is then bent to the shape herein shown.

For members 23 and 24 in the arrangement shown are provided with wide outwardly extending flanges 38 at opposite sides of channels 39—39. The channels 39 extend lengthwise of the head structure and short plates 40 are welded in position across the channels for strengthening the construction. As is clearly shown in Fig. 3, the top and bottom sides of the die forging 22 is provided with openings 41 which align with the vertically extending channels 39—39 of the die forgings 23 and 24.

By the construction as above described, the connection of the end portions of the tension member 16 with the end portions of the beam member 15 is made very strong, with the parts adapted normally to stand in the same positions as those they occupy in operation. There is no tendency for parts to be distorted in use even when a heavy leverage pressure is applied through the brake beam structure. The device is, therefore, adapted to stand up for long periods of heavy use, and the danger of breakage of any of the parts under ordinary conditions is very slight.

With one of the brake heads on position, as shown in Fig. 5, the brake shoe 19 of the ordinary construction is adapted to fit into position thereon, with the lug 36 of the brake shoe extending into the socket channel 34 of the brake head. A curved key 32a, inserted into position as shown in Fig. 5, passes through the channels 39 of members 23 and 24, through openings 41 of the socket member 22 and through a suitable opening in the lug 36 of the shoe 19 for releasably securing the brake shoe in position.

In the arrangement shown in Fig. 7, a modified form of brake head is illustrated, comprising die forgings 23a—24a which are slightly different in structure from the previously described members 23—24. In the Fig. 7 arrangement the die forging members 23a—24a are connected with a connecting plate 25a corresponding with the plate 25 of the structure first described. The members 23a—24a are similar to the members 23—24 above described except that the wide side flanges 38a—38a are formed in substantially uniform positions with respect to the bottom of channels 39a—39a. In both of these constructions, the die forging members present spaced bearing points as defined by the flanges 38—38 and 38a—38a at opposite sides of the channels 39, 39a, respectively, for engagement with the brake shoe so as to bring about an effective application of the stresses from one member to the other.

In the arrangement shown in Figs. 8 and 9, a modified form of means for supporting the brake structure on the car is shown. In this arrangement, the parts are the same as those above described in connection with the structure of Figs. 1 to 6, and are numbered the same except for the supporting parts for the brake. In the construction of Figs. 8 and 9, the upset end portions 16a of the tension member are extended longitudinally beyond the ends of the brake beam 15 and are formed with flat horizontally disposed portions 42 which are fitted with hardened steel wear plates or shoes 43. The said shoes have slideable engagement with horizontally extending slideways 44 disposed on the inner faces of said frame members 45 of the car truck. By the arrangement shown in said Figs. 8 and 9, the brake hanger is omitted and the braking means is supported so as to be movable freely horizontally toward and from the wheels 20 of the car. The braking means is at the same time held strongly against angular movement with respect to the frame members, so as to insure highly effective operation of the parts as pressure is applied on the braking means through the strut 21.

While the form and arrangement of parts as shown by my drawings and as above described are preferred, the invention is not to be limited thereto, except so far as the claims may be so limited, it being understood that changes might well be made in the arrangement without departing from the spirit of the invention.

I claim:

1. In a car brake, the combination of a brake beam member, a tension member having its end portions shaped at an angle with respect to the major portion of said tension member and welded strongly to the face of the beam member, a built-up brake head including a connecting plate having an edge portion shaped to fit the beam member and the tension member at each end of the beam structure and welded strongly to said beam and tension members, and means for spacing apart intermediate portions of the beam member and the tension member for giving the parts a tightened truss arrangement.

2. In a car brake, a unitary brake beam structure comprising in combination a beam member in the form of a channel, a tension member having its end portions shaped at an angle with respect to the major portion of said tension member and upset to substantially increased thickness and welded strongly in position in the channel of said beam member, a built-up brake head including a connecting plate having its edge portion notched out to receive the flanges of the channel and fitting snugly against the faces of the beam member and the tension member at each end of the structure and welded strongly to said members, and means for spacing apart intermediate portions of the beam member for giving the parts a tightened truss arrangement.

3. In a car brake, a unitary brake beam structure comprising a beam member, a tension member having its end portions shaped at an angle with respect to the major portion of said tension member and welded strongly to a face of the beam member, means for spacing apart intermediate portions of the beam member and the tension member for giving the parts a tightened truss arrangement, and a built-up brake head fixedly mounted on each end portion of the structure, each comprising means for releasably holding a brake shoe and a connecting plate having one of its edge portions secured to said means and another edge portion shaped to fit against face portions of the beam member and the tension member and welded strongly.

4. In a car brake, a unitary brake beam structure comprising a beam member in the form of a channel, a tension member having its end portions shaped at an angle with respect to the major portion of said tension member and upset to substantially increased thickness and welded strongly in position in the channel of said beam member, means for spacing apart intermediate portions of the beam member and the tension member for giving the parts a tightened truss arrangement, and a built-up brake head fixedly mounted on each end portion of the structure, each comprising a connecting plate having one of its edge portions notched out to receive the flanges of the channel and fitting snugly against the faces of the beam member and the tension member and welded strongly to such members along the shaped edge portion of the plate, a socket member in the form of a short length of channel welded to said connecting plate, gusset plates welded to said socket member at opposite faces of said connecting plate for reinforcing and strengthening the brake head structure, and means for releasably mounting a brake shoe in operative position on said brake head.

5. In a car brake, a unitary brake beam structure comprising a beam member in the form of a channel, a tension member having its end portions shaped at an angle with respect to the major portion of said tension member and upset to substantially increased thickness and welded strongly in position in the channel of said beam member, means for spacing apart intermediate portions of the beam member and the tension member for giving the parts a tightened truss arrangement, and a built-up brake head fixedly mounted on each end portion of the structure, each comprising a connecting plate having its edge portion notched out to receive the flanges of the channel and fitting snugly against the faces of the beam member and the tension member and welded strongly to such members along the shaped edge portion of the plate, a socket member in the form of a short length of channel welded to said connecting plate, other channel members welded to said connecting plate above and below said socket member with their channels opening away from the plate, gusset plates welded to said socket member at opposite faces of said connecting plate for reinforcing and strengthening the brake head structure, and means for releasably mounting a brake shoe in operative position on said brake head.

6. A built-up brake head comprising in combination a socket member in the form of a short channel, two other channel members above and below said socket member with their end portions welded to said socket member, a connecting plate having a portion for attachment to a brake beam and welded to all three of said channel members, gusset plates welded to said socket member and to said connecting plate at opposite faces of the connecting plate, and short plates welded across the channels of said other channel members for reinforcing and strengthening the structure.

CLARENCE W. OSNER.

REFERENCES CITED

The following references are of record in the file of this patent:

UNITED STATES PATENTS

| Number | Name | Date |
| --- | --- | --- |
| 461,776 | Alley | Oct. 20, 1891 |
| 898,908 | Crone | Oct. 22, 1907 |
| 969,861 | Huskell | Sept. 13, 1910 |
| 1,475,286 | Crone | Nov. 27, 1923 |
| 2,348,092 | Parke | May 2, 1944 |
| 2,356,720 | Aurien | Aug. 22, 1944 |
| 2,398,917 | Busch | Apr. 23, 1946 |
| 2,427,893 | Baselt | Sept. 23, 1947 |